Jan. 5, 1971    D. P. SHILEY ET AL    3,551,913

HEART VALVE PROSTHESIS WITH GUARD STRUCTURE

Filed April 2, 1968    5 Sheets-Sheet 1

INVENTORS.
JEROME H. KAY
DONALD P. SHILEY
BY
FOWLER, KNOBBE
& MARTENS
ATTORNEYS.

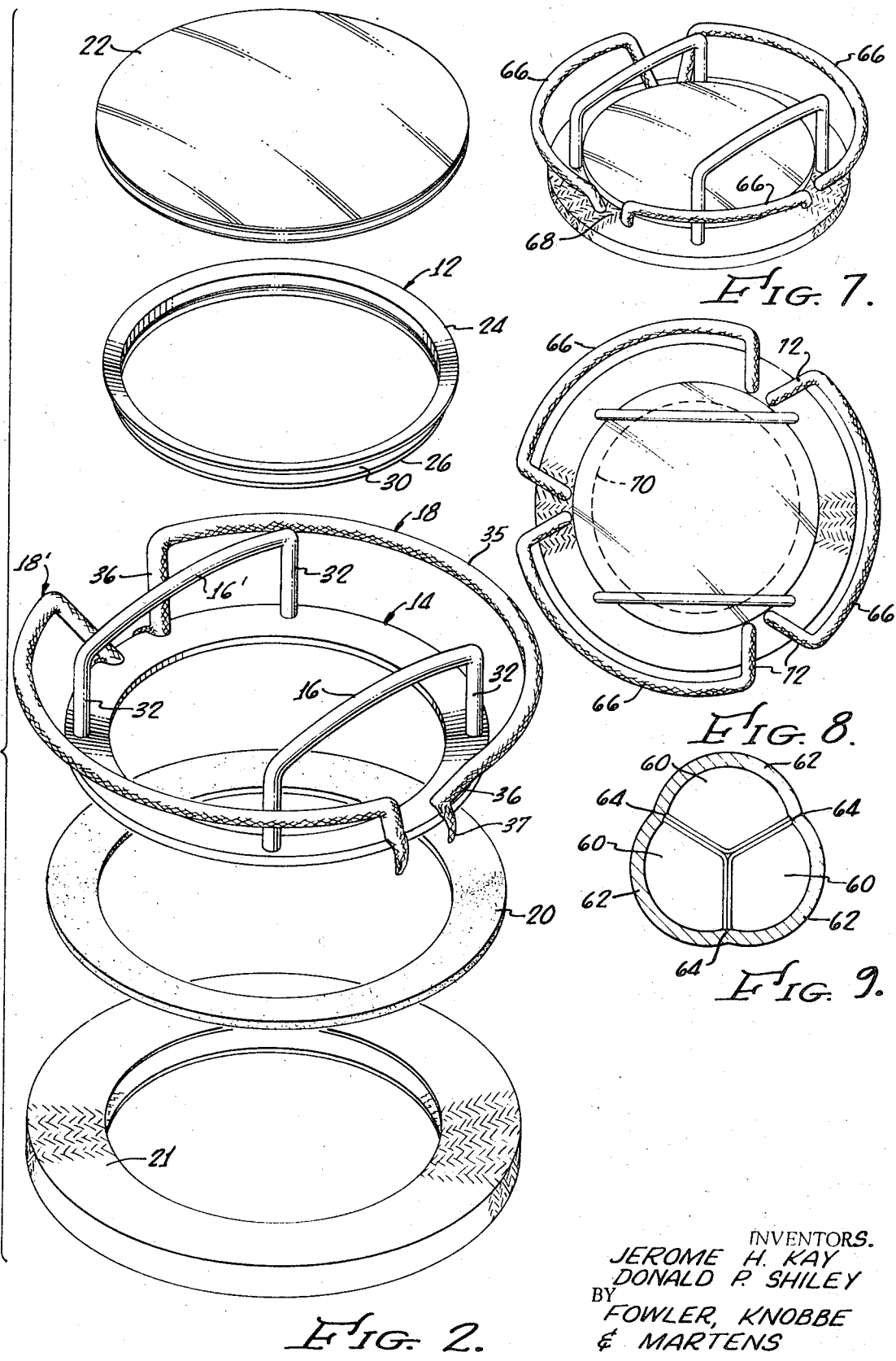

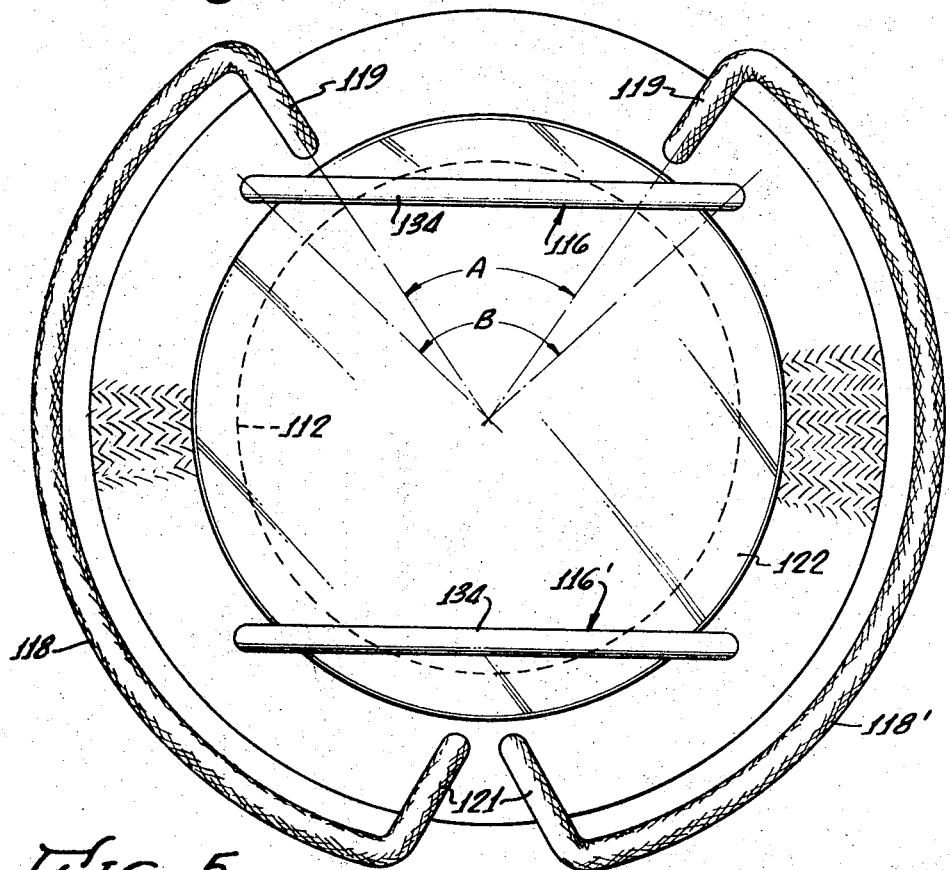
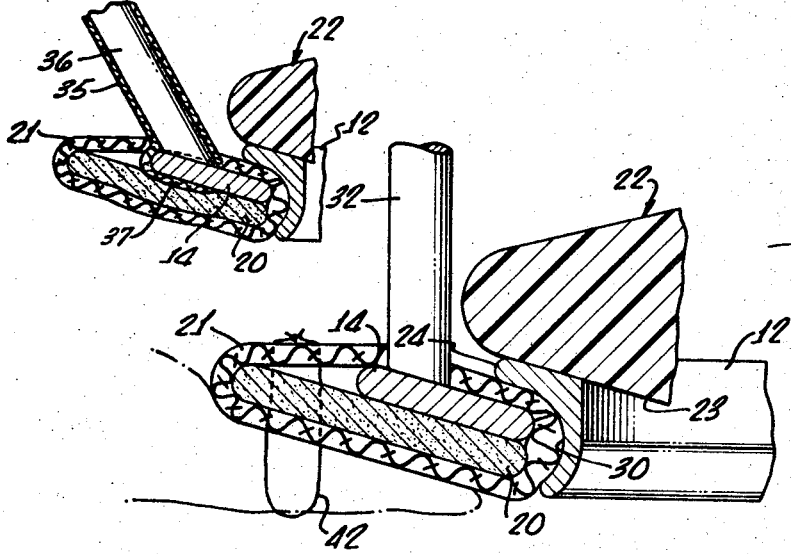

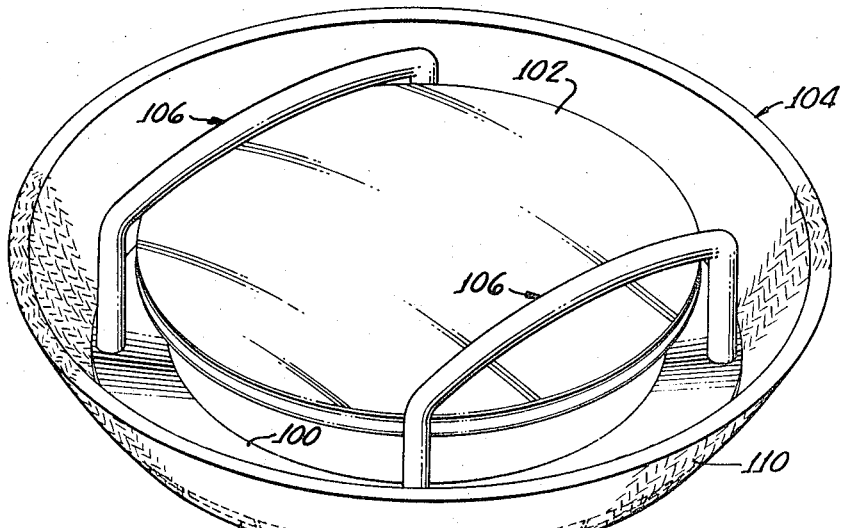
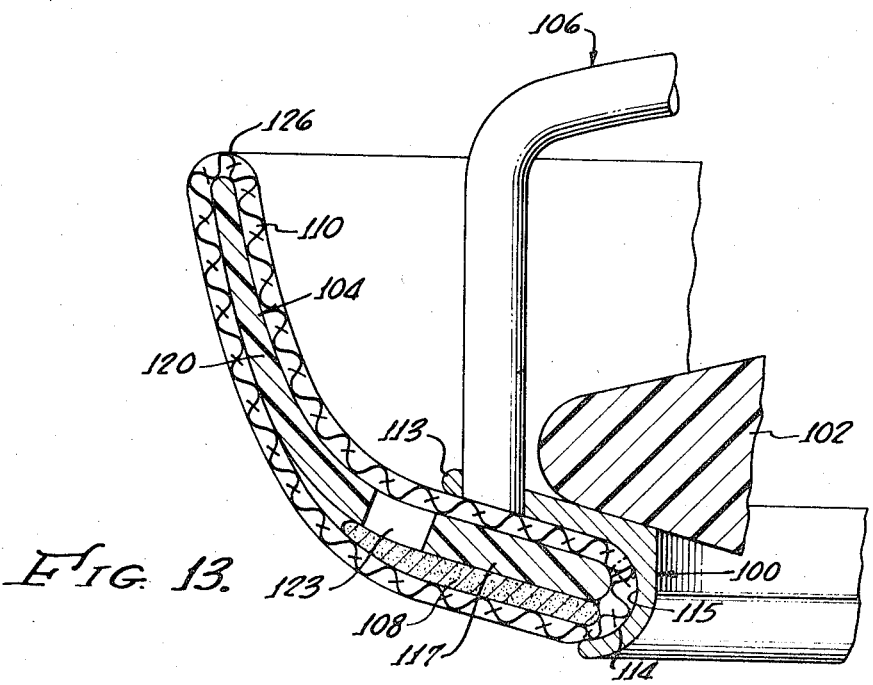

United States Patent Office 3,551,913
Patented Jan. 5, 1971

3,551,913
HEART VALVE PROSTHESIS WITH GUARD STRUCTURE
Donald P. Shiley, 11022 Huntinghorn, Santa Ana, Calif. 92705, and Jerome Harold Kay, 115 S. June St., Los Angeles, Calif. 90004
Filed Apr. 2, 1968, Ser. No. 718,157
Int. Cl. A61f 1/22
U.S. Cl. 3—1                                                  29 Claims

ABSTRACT OF THE DISCLOSURE

A heart valve prosthesis which includes a guard structure for preventing intrusion of heart muscle or other foreign tissue into the path of valve excursion. The guard in one embodiment is formed from a pair of upstanding struts mounted about the valve body intermediate the limits of valve excursion. In another embodiment the guard is formed by a plastic flange which extends upwardly and outwardly from the valve body and substantially surrounds the path of valve excursion.

RELATED APPLICATIONS

Heart valve with sepaarte suturing ring sub-assembly, Ser. No. 493,326, filed Oct. 6, 1965, by Donald P. Shiley, now U.S. Pat. No. 3,491,376.

Prosthetic Sutureless Devices and Implant Tools Therefor, Ser. No. 547,580, filed May 4, 1966, by Donald P. Shiley, now abandoned.

Cloth Covered Heart Valve, Ser. No. 673,144, filed Oct. 5, 1967, by Donald P. Shiley.

Prosthetic Sutureless Devices and Implant Tools Therefor, Ser. No. 687,249, filed December 1, 1967, by Donald P. Shiley.

BACKGROUND OF THE INVENTION

Heart valve prostheses for replacement of the semilunar and atrioventricular heart valves are primarily the discoid and the ball valve poppet types. For the replacement of the artioventricular mitral and tricuspid valves, the defective valve leaflets or cusps, the papillary muscles and the connecting chordae tendineae are usually removed partially or completely by the operating surgeon. The prosthesis is then sutured to the atrioventricular skeletal muscle of the heart valve ring or to the root of the removed leaflets to permit flow from the respective atrium into the respective ventricle during diastolic relaxation of the ventricles and to be hemodynamically closed during systolic contraction of the ventricles. Similarly, for replacement of the semilunar aortic and pulmonic valve, the prosthesis is implanted in the aorta or pulmonary artery at just above, or just below the natural aortic valve ring so that the valve is hemodynamically opened by the systolic contraction of the left or right ventricle and closed during diastole.

The general requirements for effective hemodynamic operation of heart valve prostheses are that the valve poppet rapidly and uniformly respond to contraction and relaxation of the heart with a low pressure gradient across the valve. To achieve such response it is necessary that the pressure on the valve poppet be uniform so that one portion of the poppet is not forced away from the valve seat prior to another. This is true whether the poppet is a disc or a ball. Additionally, lateral forces and nonsymmetrical forces which operate to restrict axial excursion of the poppet should be reduced to a minimum.

SUMMARY OF THE INVENTION

This invention is directed to a heart valve prosthesis including a valve body which has a valve port for providing for passage of blood therethrough. Means for attaching the prosthesis to a heart are connected to the valve body. A movable valve member is mounted in the prosthesis so that it closely overlies the valve body port and will be on the downstream side of the valve when it is mounted in a functioning heart. A guard member is connected to the prosthesis so that it surrounds a portion of the path of valve excursion for maintaining the heart tissue surrounding the prosthesis a spaced distance from the path of valve excursion.

In one embodiment of the heart valve prosthesis of this invention, the spongy inner ventricular heart muscle is maintained out of the path of excursion of the movable valve member by a pair of vertically and horizontally outwardly extending struts which are mounted about the valve body orifice. Coextensive supplementary struts may be vetrically spaced below or above the other guard struts for providing additional shielding of the valve member. In another embodiment of the heart valve prosthesis of this invention, which is more adaptable for use in replacement of aortic valves, three upstanding, outwardly extending struts are equally spaced about the orifice of the valve body.

In another embodiment of the heart valve prosthesis of this invention, the muscle guard is fromed by a plastic retainer ring which fits about the valve body and extends upwardly for from ½ to ¾ the path of valve excursion in a cup-like configuration.

One feature of the prosthesis of this invention is that a low pressure gradient is maintained across the heart valve and lateral and nonsymmetrical forces on the valve poppet are reduced so that the valve is activated by uniformly distributed pressure on the valve poppet.

Another feautre of prostheses constructed in accordance with this invention is that these prostheses can be implanted in diseased hearts which are oversized, due to the chronic load and intense and prolonged stress imposed on them by the malfunctioning of the valve being replaced, so that when the heart returns to more normal size the valve movement is not adversely affected by the spongy ventricular inner wall muscles during systolic contraction thereby maintaining lateral and nonsymmetrical forces on the valve poppet at a minimum level.

Additionally, a feature of the valve prosthesis is that it may be mounted at various angles within the heart without intrusion of the heart tissue into the path of valve excursion.

Another feature of the prosthesis of this invention is that remnants of papillary muscle or of the chordae tendinae which may be pumped into the path of excursion of the valve are substantially prevented from being even momentarily wedged between the valve poppet and the heart walls during systole.

Yet another feature of the heart valve prostheses of this invention is that the prostheses can be implanted as an aortic or pulmonic valve replacement with reduced effects of postoperative contraction of the aortic or pulmonic walls so that uniform response of the valve is maintained and the pressure gradient across the aortic or pulmonic valve is relatively low.

Another feature of the heart valve prosthesis of this invention is that it provides the surgeon with much more flexibility in selecting a heart valve prosthesis diameter which will be adequate for the enlarged heart and which will not permit intrusion of the spongy heart muscles into the path of excursion of the valve poppet when the heart returns to normal size.

Still another feature of the heart valve prosthesis of this invention is that it can be used as an aortic or pulmonic valve replacement having a low pressure gradient across the valve which is not adversely altered due to contraction of the aorta walls in toward the path of valve excursion so that unhindered flow through the coronary arteries is maintained.

Another feature of the heart valve prosthesis of this invention is that the guard members for maintaining the muscle and aorta wall spaced from the valve poppet can be employed for both the discoid and ball heart valves.

Yet another feature of the prostheses constructed in accordance with this invention is that they can be varied in size for use as aortic, pulmonic, tricuspid and mitral heart valve replacements.

Another feature of the prostheses constructed in accordance with this invention is that when a ball valve poppet is used nonsymmetrical wear of the ball due to unequal pressure gradients about its periphery caused by nonsymmetrical spacing of the ball from the muscle is reduced.

Another feature of the prostheses of this invention is that the heart tissue surrounding an implanted prosthesis is maintained in substantially symmetrically spaced relation with the path of valve excursion by the rod-like guard members of the prosthesis.

BRIEF DESCRIPTION OF DRAWINGS

FIG. 2 is an exploded view of the prosthesis of FIG. 1;

FIG. 3 is a sectional view through the prosthesis of FIG. 1 substantially along line 3—3 with the valve sutured in place;

FIG. 5 is a partial sectional view taken through the valve of FIG. 1 substantially along line 5—5;

FIG. 6 is a plan view of another embodiment of the heart valve prosthesis constructed in accordance with this invention;

FIG. 7 is an oblique view of another embodiment of a heart valve prosthesis in accordance with the present invention;

FIG. 8 is a plan view of the prosthesis of FIG. 7;

FIG. 9 is a diagrammatic view of a closed aortic valve as seen through a cross-section of the aorta artery above the aortic valve;

FIG. 12 is an oblique view of still another embodiment of a heart valve prosthesis constructed in accordance with this invention; and FIG. 13 is a partial sectional view of the prosthesis of FIG. 12.

DESCRIPTION OF PREFERRED EMBODIMENTS

Figure 1:
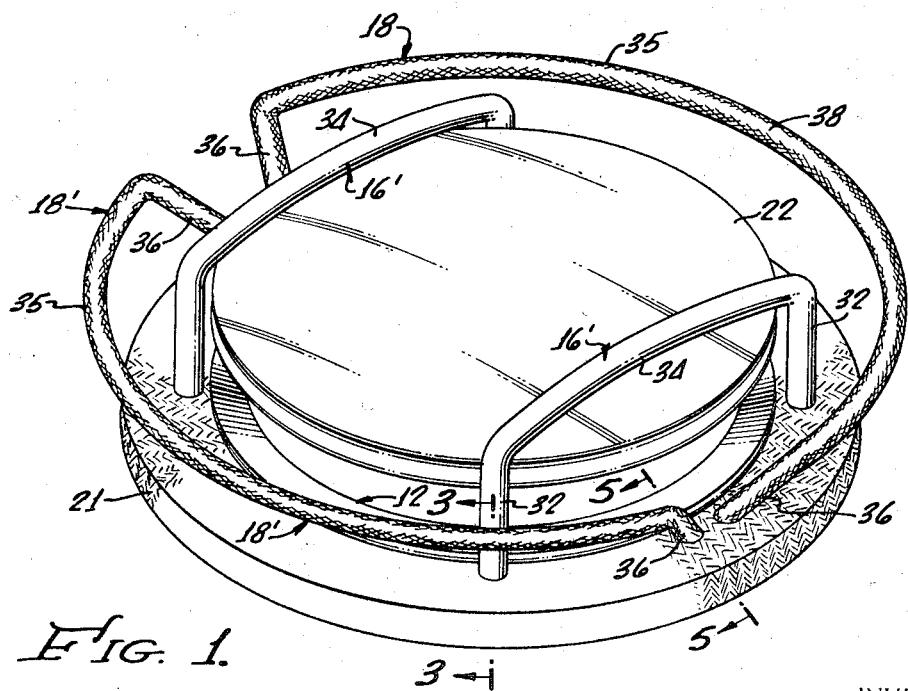
FIG. 1 is an oblique view of the heart valve prosthesis constructed in accordance with this invention.

Referring now to FIGS. 1 and 2 wherein a prosthesis structure constructed in accordance with this invention is shown for purposes of illustration with a disc valve which is claimed in aforementioned application Ser. No. 673,144, the prosthesis comprises an annular valve ring or body member 12, an annular retaining ring 14 which fits about the valve body 12 and carries a pair of identical, upstanding, metallic, rod-like, valve cage members 16 and 16' and a pair of identical rigid, metallic valve guard rods or struts 18 and 18'. An annular cloth suture pad 20 is fitted about the valve body snugly below the retaining ring 14 and enclosed with the retaining ring in a suture cloth 21, as best shown in FIG. 3. The suture cloth and suture pad are constructed from fibers such as the tetrafluoroethylene fluorocarbon resin Teflon or the polyethylene terephthalate resin Dacron.

The valve poppet disc 22 is fitted above the valve body 12 within the cage members 16 and 16' which define the path and limit of its excursion.

As best shown in FIG. 2, the valve body 12 comprises an annular ring formed from integrally connected frustro-conical upper and lower flanges, 24 and 26 respectively. A central groove 30 is defined intermediate the upper flange 24 and the lower flange 26 about the outer periphery of the valve body. The frustro-conical surface of the upper flange 24, as can be seen from FIGS. 1 and 3, forms a seat for the valve disc 22. The valve body 12 is preferably constructed of a resilient metal such as the cobalt base alloy Stellite #21 or any other alloy which is strong and corrosion resistant.

The movable valve poppet disc 22 has a frustro-conical seating surface 23 (see FIG. 3) on its underside which mates with the upper flange 24. The outer edge of the disc 22 and the outer edge of the upper flange 24 are both rounded in section and their respective points of tangency to the seating surfaces 23 and 24 are approximately opposite each other. Preferably the disc is made from a silicone rubber such as Silastic. Metals and plastics such as Teflon make suitable discs, however.

The retaining ring 14 is frustro-conical and washer shaped. It may be integrally formed with the inverted U-shaped, rod cage members 16 and 16' and rigid metallic guard rods or struts 18 and 18' thereon or the cage members and the guards may be welded thereto. The cage members are attached to the retaining ring 14 by means of upstanding legs 32 which are joined to each other by a substantially horizontally extending excursion limit bar 34. Preferably two cage members are used to retain the disc 22 in the valve and to define the path and outer limit of excursion of the disc. The cage members and retaining ring are advantageously constructed from a strong, springy, resistant alloy such as the cobalt base alloys Haynes 25 or Stellite.

The rod-like guard strut members 18 and 18', as shown in FIG. 2, are preferably welded to the retaining ring 14 and individually enclosed in a cloth protective sleeve 35 of a material such as Teflon or Dacron which may be loosely woven to induce tissue ingrowth and prevent thrombus formation.

Figure 4:
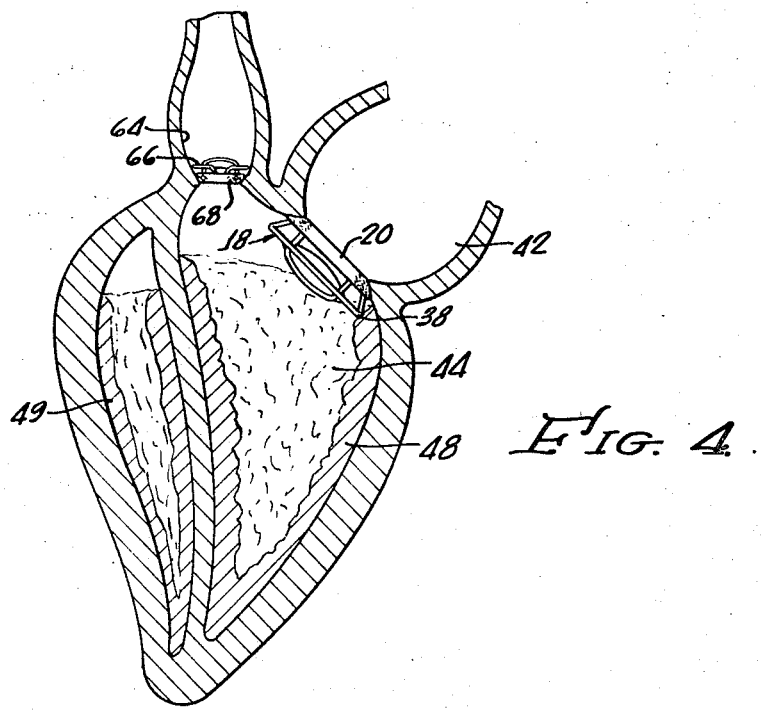
FIG. 4 is a diagrammatic view of the heart with the prostheses inserted in place of the mitral and aortic valves.

Each of the rod-like guards 18 and 18' includes a pair of upwardly and outwardly extending strut legs 36 and an outwardly curved upper guard portion 38. The upper guard portion 38 advantageously has a radius of curvature which is greater than the radius of curvature of the retaining ring 14 and is concentric therewith. The angle of outward incline of the guard strut legs 36 is sufficiently great so that the guards extend outwardly of the valve body by a distance sufficient to contact the spongy ventricular heart muscles and maintain them spaced from the path of excursion of the valve disc. For example, it has been found that the strut legs may be inclined at an angle of about 60° with the horizontal. Preferably the radius of curvature of the muscle guard strut portion 38 is greater than that of the valve ring 12 so that it extends outwardly of the valve ring 12 and cloth pad 20 when the prosthesis is sutured in place in a heart as shown in FIG. 4. The upper portion 38 of the guard strut preferably does not extend above the retaining ring by a distance as great as the cage legs since the function of the guards, i.e. to prevent muscle from intruding into the path of valve excursion and space the muscle symmetrically therefrom can best be accomplished with shorter guards so that the muscle tissue cannot slip beneath the struts 18 and 18' and within the cage members 16 and 16'. Since the guards 18 and 18' extend outwardly of the cloth suture pads 20, there is also little possibility that the muscle will slip over the guard into the path of valve poppet excursion. The guards must be sufficiently rigid so that the contracting muscles cannot deform them and are advantageously constructed of a rigid, resistant alloy such as the cobalt base alloy Haynes 25.

The circumferential spacing between the guard struts 18 and 18', as shown in FIGS. 1 through 3, is so small that the effective guard area extends substantially entirely about the entire periphery of the valve. Various spacings and various numbers of guard struts may be used as will be discussed.

The method of assembling the valve body, the retaining ring 14, the cloth suture pad 20 and the cloth covering 40 is described in detail in copending application Ser. No. 673,144, filed Oct. 5, 1967 which is hereby incorporated by reference. Briefly the prosthesis is assembled by radially expanding the cloth suture pad 20 and the retaining ring 14 and snapping them over the lower flange 26 into the groove 30 on the valve body 12. The suture cloth 21 is sewn over the retaining ring and the cloth suture pad with the seam at its inner periphery prior to snapping them in place. Since the inside diameter of the retaining ring 14 is approximately equal to the outside diameter of the lower flange 26 of the valve body 12, the retaining ring 14 is forced over the lower flange 26 working circumferentially around the flange and taking advantage of the springy character of the metal and the compressibility of the suture pad cloth.

If a cloth sleeve of a material such as Dacron or Teflon is to be used the guards 18 and 18' are first covered with a loosely woven cloth tubing or sleeve 35. This may be accomplished by using a piece of cloth tubing which is longer than the guard members so that the ends of guard legs 36 can be pushed through the sides of the loosely woven cloth without breaking any of the fibers thereby letting the ends 37 of the cloth sleeve 35 extend beyond the ends of the guard (see FIG. 2). The tubing is fitted over the guard as a sleeve and both ends of the guard are pushed through the tubing 30 so that the free ends 37 of the tubing extend beyond the ends of the guard legs 36. The cloth is then bunched at the center portion of the curved member 38 and taped in place by Teflon or Dacron tape or other inert, strong, tape to protect the cloth while the guard legs 36 are welded to the retaining ring 14. The guard legs are then welded so that no impurities are introduced and the weld is then highly polished and sonically cleaned. The tape is then removed and the cloth sleeve 35 is extended to cover the entire guard strut. The free ends 37 of the sleeve 35 may then be tucked between the retaining ring 14 and the suture pad 20 as shown in FIG. 5 and sewn to the suture pad 20 so that no broken fibers or stray ends of the sleeves 35 are available to hinder valve movement. Each of guard struts 18 and 18' is attached in this manner.

As shown in FIG. 3, the prosthesis is implanted at the root of the removed valve cusps or on the natural heart valve ring by passing sutures 42 (not shown) through the suture cloth 21, the suture pad 20 and the heart tissue.

FIG. 4 illustrates diagramatically how the heart valve prosthesis of FIGS. 1 through 3 may be sutured to a human heart as a mitral valve replacement intermediate the left atrium 42 and the left ventricle 44. The upper guard members 38 of the struts 18 and 18' extend toward the spongy inner ventricular muscles 48 and maintain these muscles spaced from the path of valve excursion during systolic contraction of the left ventricle so that the valve can seal and prevent regurgitation into the left atrium. As can be seen in FIG. 4, the width of the right ventricle 49 is even less than that of the left ventricle so that muscle intrusion into the path of valve excursion for the right atrioventricular tricuspid valve is also a problem which is alleviated by use of the prosthesis of this invention.

FIG. 6 illustrates another embodiment of the heart valve prosthesis of this invention. This embodiment of the prosthesis is similar to that discussed with respect to FIGS. 1 through 3 in that it basically comprises the same valve structure. The muscle guard struts 118 and 118' in this embodiment, however, are circumferentially spaced farther apart at one end 119 than at the other 121. When used as a mitral valve replacement, the larger spacing between the guard struts is adapted to be disposed opposite the aorta above the rigid skeletal muscle which forms the natural mitral heart valve ring and the aortic valve ring. With this embodiment, the overall weight of the valve may be reduced by reducing the size of the guard struts 118 and 118' whereas the function of the struts is still maintained since there is little spongy muscle intermediate the skeletal muscle of the natural aortic valve ring and the natural mitral valve ring and a guard strut is not essential in this area. This substantially smooth skeletal muscle connection between these natural valve rings has substantially no surface which could intrude into the path of valve excursion.

It has been found that the circumferential spacing between the legs 119 of the guard struts represented by angle A may be varied up to 180° (with two or only one guard) for this area intermediate the aortic valve and the mitral valve. By way of example the angular spacing indicated by angle B between the legs of one of the valve cage members 116 may be about 99°. The other portions of the valve of FIG. 6 are substantially identical to that discussed with respect to FIGS. 1 through 3.

Referring now to FIGS. 7 through 9, wherein another embodiment of the heart valve prosthesis of this invention is shown. This prosthesis is particularly adapted to be used for replacement of the aortic or pulmonic heart valve. The aortic and pulmonic valve are formed by three cusps or leaflets 60 (FIG. 9) which open during systole of the left or right ventricle to permit blood flow from the heart into the aorta or pulmonary artery and close during diastole to prevent regurgitation from the aorta into the left ventricle or from the pulmonary artery into the right ventricle. The valve cusps or leaflets 60 are connected to the aortic wall or pulmonic in a substantially symmetrical manner as diagrammatically shown in FIG. 9.

Behind the aortic and pulmonic valve cusps 60 on the aortic wall are three outpouchings 62, the Sinuses of Valsalva, which help prevent obstruction of the coronary ostia. The junctions 64 of the Sinuses of Valsalva extend inwardly toward the axis of the aorta and increase the pressure required for flow around the periphery of the valve poppet of a replacement prosthesis. The prosthesis shown in FIGS. 7 and 8 restricts excessive pressure build up in this region by providing three upwardly and outwardly extending aortic wall guards 66. These guards are mounted on a cloth covered suture pad and retaining ring 68, such as discussed with respect to FIGS. 1 through 3, about a valve body 70. The guards 66 are connected to the retaining ring by integrally connected, metallic, rod-like legs 72 which extend upwardly and outwardly from the retaining ring. The guards may be welded to the retaining ring and covered with a cloth sleeve as discussed with respect to the guards 18 and 18' of FIGS. 1 through 3.

The prosthesis of FIGS. 7 and 8 is adapted to be used for aortic valve replacement and implanted so that the central portion of each of the guards 66 comes into contact with one of the natural valve cusp junctions 64 (see FIG. 4). In this manner the aortic wall is maintained at a sufficient distance from the prosthesis so that the pressure gradient during opening of the valve and across the valve is maintained low and so that the coronary arteries are not blocked by the prosthesis.

Figure 10:
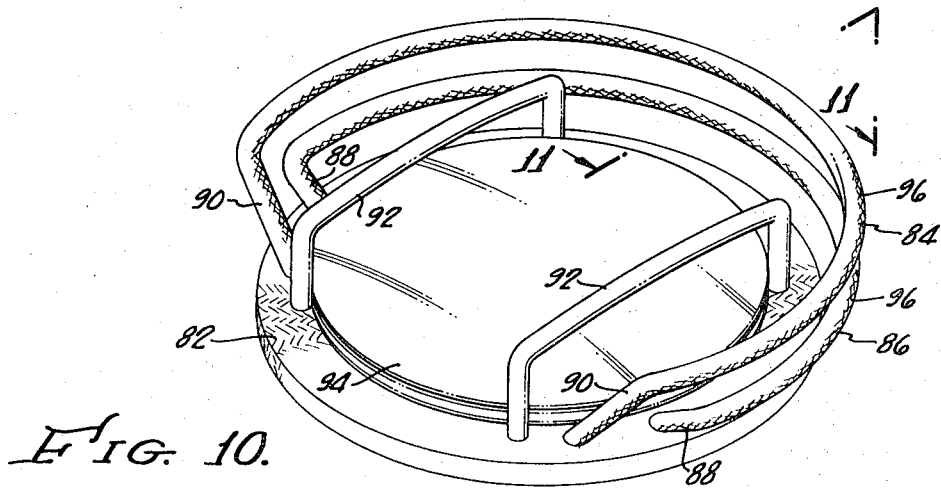
FIG. 10 is an oblique view of still another embodiment of the heart valve prosthesis constructed in accordance with this invention.

Referring now to FIG. 10 which illustrates another embodiment of the heart valve prosthesis of this invention. This prosthesis includes a valve ring 80, a cloth covered retaining ring 82, and upper and lower metallic rod-like guard struts 84 and 86 which are substantially coextensive and extend about the periphery of the valve ring 80 to form a guard wall from the vertically spaced guards. The lower guard strut 86 is connected to the retaining ring 82, as described with respect to FIG. 2, by a pair of guard legs 88 which extend upwardly and outwardly from the retaining ring. The guard legs 88 support the curved guard strut 86 outwardly from the circumference of the valve ring 80 and the retaining ring 82. The upper guard member 84 is connected in a similar manner to the retaining ring 82 by a pair of upwardly and outwardly extending guard legs 90 which are longer than the guard legs 88 of the lower guard 86. The guard legs 88 are also inclined outwardly at a smaller angle from the retaining ring 82.

Figure 11:
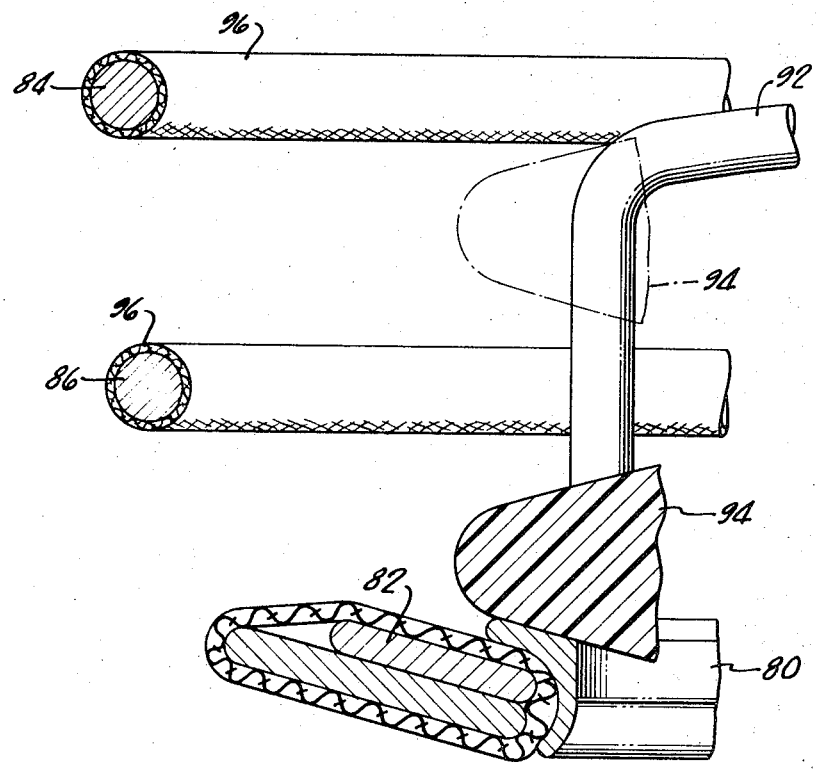
FIG. 11 is a sectional view taken through one portion of the valve ring of FIG. 10 substantially along line 11—11.

Consequently the upper guard 84 extends radially outwardly by a slightly greater distance than the lower guard 86 as best shown in FIG. 11. It has been found that this arrangement of the guard members prevents the heart muscles and tissue from extending inwardly toward the valve member either over or under the guard structure.

As shown in FIG. 11 the upper guard 84 extends above the cage members 92 and above the highest position of the valve member 94 (phantom lines). The lower guard member 86 is vertically spaced from the retaining ring 82 by a distance which is equal to substantially half the length of the path of excursion of the valve member 94. These spacings above the retaining ring 82 have been found to be most advantageous when two concentric and substantialy circumferentialy coextensive guard struts are used about the path of valve excursion. Any selected spacing may be used however. As shown in FIG. 11, the guard struts may be encased in a cloth tubing 96 as discussed with respect to FIGS. 1 through 8.

As shown in FIG. 10, the outer and upper guard 84 extends circumferentially about the valve by a greater distance than the lower guard 86. This is the most practical construction of such a prosthesis. As shown, the circumferential spacing between the legs of the upper guard member is about 120° and that between the legs of the lower guard 86 is slightly greater.

Although the use of a pair of guard members which are substantially circumferentially coextensive and which extend by different distances vertically above the valve ring has been shown with a prosthesis having guard members which extend by a substantial circumferential distance about the valve ring 80 and the retaining ring 82, it is clear that guard struts which are spaced vertically above the retaining ring can be used with a prosthesis having a guard structure such as shown in FIGS. 2 and 6, or if a very lightweight guard member material is used with a prosthesis such as shown in FIGS. 7 and 8. The vertical spacing of the struts assists in all of these embodiments in maintaining the heart tissue spaced from the path of valve excursion.

REPRESENTIVE ALTERNATIVE EMBODIMENT

Referring now to FIGS. 12 and 13 which illustrate another embodiment of the valve prosthesis of this invention, it will be seen that this embodiment comprises basically a valve ring or body 100, a valve disc poppet 102, an annular plastic guard 104, a pair of valve cage members 106 mounted on the valve body 100 and a cloth suture pad 108 (FIG. 13). The plastic guard 104 and suture pad 108 are enclosed in a suture cloth 110 which promotes tissue ingrowth and discourages clotting.

The valve body 100 is provided with an outwardly extending upper flange 113 and an outwardly extending lower flange 114 which form an external groove 115 as best shown in FIG. 13. The upper flange 113 supports the legs of the valve cage members 106 which may be formed integrally with the valve body 100 or welded thereto.

The guard 104 is fitted in the groove 115 as shown in FIG. 13 along with the suture pad 108. Guard ring 104 is molded to have an annular lower portion 117 and an outwardly and upwardly extending guard flange portion 120 which defines a divergent channel for flow about the disc 102. A plurality of circumferentially and radially extending, closely spaced suture holes 123 are provided about the circumference of the border between the base 117 and the divergent guard flange portion 120 for passing sutures therethrough and fixing the prosthesis in place in a heart. The suture pad 108 is fitted beneath the plastic guard 104 so that it is behind suture holes 123 for receiving the sutures which pass through holes 123 and providing means for firmly implanting the prosthesis in a heart. Typically the suture holes may be rectangular holes of about 1/16" by 1/4" circumferentially spaced closely about the guard rings 104. It has been found that 16 suture holes are sufficient. Any number adequate to permit effective suturing of the prosthesis to a heart may be used, however. As shown in FIG. 12, the suture holes 123 are separated circumferentially by thin connecting spokes 124 which join portions 117 and 120 of the plastic guard 104.

The plastic guard 104 may be produced from a tetrafluoroethylene fluorocarbon resin such as Teflon, a polymethacrylate resin, or other such resistant plastic materials. The cloth 110 and the suture pad 108 are advantageously Teflon or Dacron.

The upwardly and outwardly extending guard 104 functions effectively to maintain the spongy inner ventricular muscles out of the path of valve excursion and at the same time is both lightweight and non-thrombus encouraging. The upper guard portion 120 defines a diverging channel for blood flow which provides a steady, gradual increase in flow area from the valve body 100 to the upper edge 126 of the guard portion 120. The angle of divergence of the guard 120 is that angle necessary to provide a hydraulically efficient increase in flow area to convert a maximum amount of the velocity energy back to a pressure head. For example in hydraulic flow through hollow tubes the most efficient increase in flow area is defined by an angle of divergence of about 15 degrees.

The suture cloth 110 may be dispensed with if the muscle guard 104 is constructed of Teflon and similar plastics which do not encourage thrombus formation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A heart valve prosthesis comprising:
   a valve body having an orifice providing a passage for fluid flow;
   means connected to said valve body for attaching said prosthesis to a heart;
   a movable valve member mounted over said valve body and adapted to move along an excursion path between an open and closed position with respect to said orifice;
   cage means connected to said valve body for limiting movement of said valve member away from said orifice;
   a retaining ring extending about said valve body and frictionally connected thereto for connecting said attaching means to the valve body; and
   guard means connected to said retaining ring and substantially extending about said path of excursion of said valve member for maintaining the tissue surrounding said prosthesis a spaced distance from the path of excursion of said movable member.

2. A prosthesis as defined in claim 1 wherein said guard means extends substantially entirely about the path of excursion of said valve member.

3. A heart valve prosthesis as defined in claim 1 wherein said guard means comprises a pair of guard struts fixedly mounted on said prosthesis.

4. A heart valve prosthesis as defined in claim 3 wherein said guard struts are substantially coextensive circumferentially about said valve ring and are vertically spaced from each other.

5. A heart valve prosthesis as defined in claim 1 wherein said guard means comprises a pair of upstanding guard struts which are each fixedly connected to said prosthesis by a pair of legs disposed about the periphery of said valve body.

6. A heart valve prosthesis as defined in claim 5 wherein said guard struts are substantially coextensive and vertically spaced with the uppermost strut being spaced radially outwardly from said valve member by greater distance than said lower strut.

7. A heart valve prosthesis as defined in claim 5 wherein said guard struts are spaced about the periphery of said valve body in a manner so that the spacing between said guard struts at one end thereof is greater than at the other.

8. A heart valve prosthesis as defined in claim 7 wherein said spacing between the ends of said guard struts at said one end thereof varies up to 180 degrees.

9. A heart valve prosthesis as defined in claim 1 wherein said guard means comprises an upstanding strut extending outwardly from the valve body about the path of excursion of said movable member.

10. A heart valve prosthesis as defined in claim 1 wherein said guard means comprises a plurality of upstanding, outwardly extending guard struts mounted above said valve body and extending outwardly thereof to prevent heart tissue from intruding into the path of excursion of said movable member.

11. A heart valve prosthesis as defined in claim 10 wherein said guard struts are vertically spaced from one another and substantially coextensive circumferentially.

12. A heart valve prosthesis as defined in claim 11 wherein said uppermost guard strut extends above the path of excursion of said valve member and the remaining guard struts are vertically spaced intermediate said uppermost strut and said valve ring about the path of valve excursion.

13. A heart valve prosthesis as defined in claim 1 and particularly adaptable for use in replacement of an aortic or pulmonic valve wherein said guard means comprises three upstanding guard struts mounted on said prosthesis and spaced about said valve body to extend outwardly therefrom about the path of valve excursion so as to contact the aortic walls and maintain them spaced from the path of valve excursion when said prosthesis is implanted as an aortic valve replacement.

14. A heart valve prosthesis as defined in claim 1 wherein said guard means comprises an upstanding strut encased in a cloth sleeve, said strut extending outwardly from the valve body about the path of excursion of said movable member.

15. A heart valve prosthesis as defined in claim 1 wherein said means for attaching said prosthesis to a heart comprises an annular suture pad and wherein said guard means comprises an upstanding strut mounted about said valve body, said prosthesis further including an annnular retaining ring mounted about said valve body, said strut being fixedly mounted on said retaining ring, and said suture pad and said retaining ring being frictionally connected to said valve body.

16. A heart valve prosthesis as defined in claim 15 wherein said guard strut is encased in a cloth sleeve so that the ends of said guard strut protrude through a side of said cloth sleeve and so that the ends of said cloth sleeve extend beyond said guard strut and are maintained between said retaining ring and said suture pad so that there are no broken fibers or stray fibers extending from said cloth sleeve into the path of valve excursion or from the prosthesis.

17. A heart valve prosthesis as defined in claim 1 wherein said guard means comprises an outwardly extending flange on the downstream side of said valve member which substantially surrounds the excursion path of said movable member to define a divergent flow channel about said excursion path.

18. A heart valve prosthesis as defined in claim 17 wherein the said flange defines a flow channel which diverges at a sufficient angle to provide a hydraulically efficient increase in flow area.

19. A heart valve prosthesis as defined in claim 17 wherein said flange is made from a tetrafluoroethylene fluorocarbon resin.

20. A heart valve prosthesis as defined in claim 17 wherein said flange is integral with said retaining ring and contains a plurality of circumferentially spaced suture holes therein for attaching said prosthesis to a heart.

21. A heart valve prosthesis as defined in claim 20 further including an annular cloth suture pad as said means for attaching said prosthesis to a heart, said suture pad being spaced behind said suture holes so that sutures passed through said suture holes also pass through said pad.

22. A heart valve prosthesis comprising:
a valve body having an orifice therethrough and upper and lower outwardly extending flanges defining a peripheral groove on the outer surface of said body;
a movable valve member adapted to move between positions which open and periodically close the orifice of the valve body;
means connected to the prosthesis for limiting the movement of said movable member away from said orifice;
an annular retaining ring having its inner edge near the groove wall and its outer edge a substantial distance outward from the groove;
a cloth suture ring covering the retaining ring, the thickness of the suture ring being approximately the same as the thickness of the valve body; and,
means connected to said retaining ring and extending toward the downstream side of said valve for maintaining foreign tissue spaced from said movable valve member and said valve body.

23. A heart valve prosthesis as defined in claim 22 wherein said means for maintaining foreign tissue spaced comprise a plurality of upstanding, outwardly extending, cloth covered struts mounted on said retaining ring.

24. A heart valve prosthesis as defined in claim 22 wherein said means for maintaining foregin tissue spaced comprise a pair of rod-like, curved guard struts fixedly mounted to said retaining ring.

25. A heart valve prosthesis as defined in claim 24 wherein said struts are vertically spaced above said retaining ring and from each other and extend circumferentially about the path of valve excursion.

26. In a heart valve prosthesis for use in replacement of the aortic heart valve and having an annular valve body with an orifice therein, a movable member for moving between an open and closed position with respect to said orifice, a means for limiting movement of said movable member away from said orifice, a muscle guard structure comprising three rod-like guard members mounted to extend along the path of movement of said movable member and about the periphery of the valve body in circumferentially spaced relationship so as to be aligned with the junctions of the aortic sinuses when said prosthesis is implanted as an aortic valve replacement and means connected to the valve body for attaching said valve prosthesis in place of a natural heart valve.

27. A method for assembling a heart valve prosthesis guard structure comprising the steps of:
providing a valve body defining a through orifice and having an annular groove on the exterior surface thereof;
providing a movable valve member for moving into sealing relation with said through orifice;
providing a retaining ring having means mounted thereon for defining the limits and path of excursion of said valve member and having an internal diameter which is substantially the same as the external diameter of a portion of said valve body;

providing a rod-like guard member for mounting on said retaining ring to maintain heart tissue spaced from said valve body;

providing a cloth sleeve of substantially the same diameter as said rod-like guard member, said sleeve being constructed from loosely woven fibers;

passing said sleeve over said rod-like guard member by passing the ends of said rod-like guard member through the loosely woven cloth adjacent the opposite ends of said sleeve;

bunching said sleeve near the mid portion of said guard member;

covering said bunched sleeve with a protective material to prevent foreign matter from contacting said sleeve;

welding the opposite ends of said guard member to said retaining ring so that said guard member extends upwardly from said retaining ring and outwardly of said retaining ring;

cleaning the weldments at the junction of said guard member and said retaining ring to remove all foreign matter and loose particles therefrom;

removing the protective material from said sleeve;

slipping said sleeve outwardly toward the opposite ends of said cloth member to provide a cloth covering for all surfaces of said guard member so that the ends of said sleeve extend beyond the ends of said guard member;

tucking the ends of said sleeve beneath said retaining ring;

providing an annular suture pad of substantially the same internal diameter as said retaining ring;

forcibly mounting said retaining ring in said groove on said valve body with the ends of said cloth sleeve tucked beneath said retaining ring;

mounting said annular suture pad in said valve body incontiguous relationship with said retaining ring so that said ends of said sleeve are firmly fitted between said retaining ring and said suture pad; and covering said retaining ring and said suture pad with a suture cloth.

28. A method as defined in claim 27 further including the step of sewing the ends of said sleeve to said suture pad.

29. A method as defined in claim 27 wherein a plurality of guard members are mounted on said retaining ring in the manner described.

References Cited

UNITED STATES PATENTS

| 3,464,065 | 9/1969 | Cromie | 3—1 |
| 3,466,671 | 9/1969 | Siposs | 3—1 |

FOREIGN PATENTS

| 1,016,811 | 1/1966 | Great Britain | 3—1HV |

OTHER REFERENCES

"Prosthetic Replacement of the Mitral Valve," The Lancet, Nov. 24, 1962, page 1987 relied upon.

"Stainless Steel Disc Valve For Cardiac Valve Replacement," by K. R. Williams et al., Journal of Thoracic and Cardiovascular Surgery, vol. 49, No. 4, April 1965, pages 540-549.

"Simplified Insertion of Aortic Homograft Valves With Nonthrombobenic Prosthetic Frames," by N. S. Braunwald et al., Trans. Amer. Soc. Artif. Int. Organs, vol., XIII, June 16, 1967, pages 111-115.

DALTON L. TRULUCK, Primary Examiner

R. L. FRINKS, Assistant Examiner

U.S. Cl. X.R.

137—533; 29—469

PO-1050
(5/69)

UNITED STATES PATENT OFFICE
CERTIFICATE OF CORRECTION

Patent No. 3,551,913      Dated January 5, 1971

Inventor(s) D. P. Shiley et al

It is certified that error appears in the above-identified patent and that said Letters Patent are hereby corrected as shown below:

Col. 1, line 26, "sepaarte" should be --separate--; line 42, "artioventricular" should be --atrioventricular--.
Col. 2, line 25, "fromed" should be --formed--; line 50 "tendinea" should be --tendineal--.
Col. 5, line 37, delete "30" after "tubing"; line 55, "(not shown)" should be --(one shown)--.
Col. 7, line 26, "substantialy circumferentialy" should be --substantially circumferentially--.

Signed and sealed this 22nd day of June 1971.

(SEAL)
Attest:

EDWARD M. FLETCHER, JR.
Attesting Officer

WILLIAM E. SCHUYLER, JR
Commissioner of Patents